Sept. 20, 1971   TOSHINOBU OGURA   3,606,524
INVERTED TELEPHOTO TYPE WIDE-ANGLE LENS SYSTEM
Filed May 29, 1969                        2 Sheets-Sheet 1
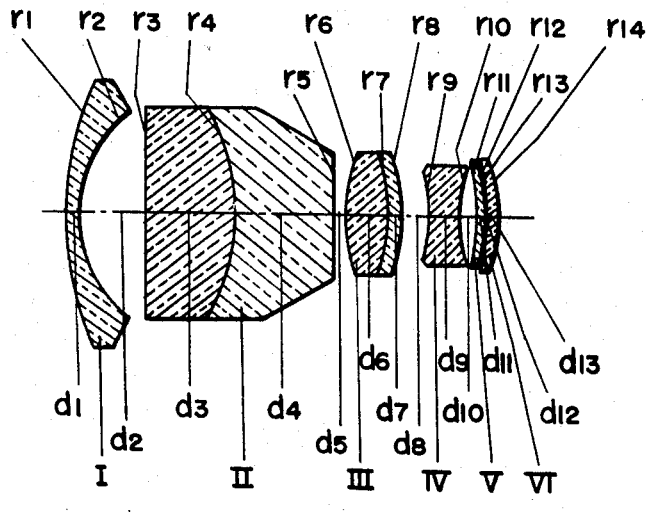
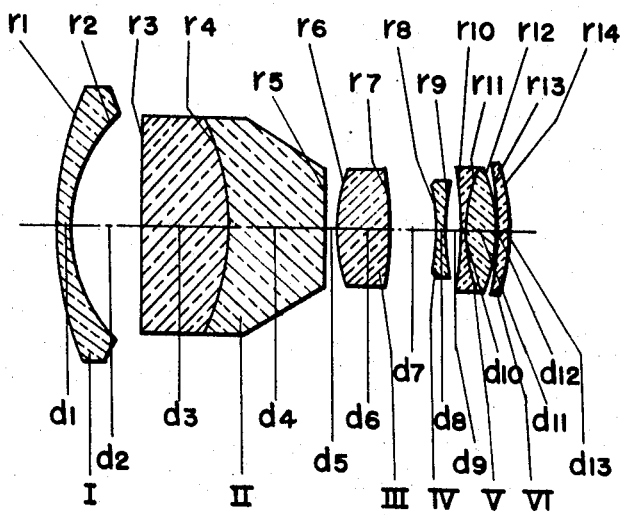

United States Patent Office 3,606,524
Patented Sept. 20, 1971

3,606,524
INVERTED TELEPHOTO TYPE WIDE-ANGLE LENS SYSTEM
Toshinobu Ogura, Sakai-shi, Japan, assignor to Minolta Camera Kabushiki Kaisha, Osaka, Japan
Filed May 29, 1969, Ser. No. 829,028
Claims priority, application Japan, June 1, 1968, 43/37,355
Int. Cl. G02b 9/62
U.S. Cl. 350—215                                           4 Claims

ABSTRACT OF THE DISCLOSURE

An inverted telephoto type wide-angle lens system used for a photographic or cinecamera, which is composed of an air spaced 6-group lens comprising seven or eight lenses, and more particularly an inverted telephoto type wide-angle lens system capable of making a good image, which second lens group is provided with a thick lens interposed therebetween in order to decrease the aperture of the suitable front lens for cameras for large size pictures.

BACKGROUND OF THE PRESENT INVENTION

In the prior inverse telephoto wide-angle lenses, it is well known that in order to obtain a capacity to make a good image the aperture of the front lens is large relative to the focal length of the system.

This fact does not pose a problem so much in cameras for smaller size pictures than 35 mm., however, in cameras for large size pictures such as 6 x 6 cm., 6 x 9 cm., etc., when the diameter of the front lens is large the portability is decreased and in addition the diameter of a filter to be attached to the lens also has to be increased in the same manner, with the result that the cost is not only high but also it is impossible to use the filter in common with that for the standard lens.

SUMMARY OF THE PRESENT INVENTION

The object of the present invention is to provide an inverted telephoto type wide-angle lens system in which the back focus is more than 1.2 times as long as the focal length of the whole system, permitting a picture image having enough circumferential light quantity in the view angle of 75 degrees and the aperture ratio 3.5, by means of a novel lens formation, and which is composed of 6 lens groups and in which it is possible to turn the effective diameter of the front lens to the small diameter of substantially the same value as the focal length of the system to be suitable for cameras in large size pictures.

BRIEF DESCRIPTION OF THE DRAWINGS

FIG. 1 shows the first embodiment composed of an air spaced 6-group of eight lenses in accordance with the present invention.

FIG. 2 shows the second embodiment composed also of an air spaced 6-group of eight lenses in accordance with the present invention.

DESCRIPTION OF THE PREFERRED EMBODIMENT

Figure 3:
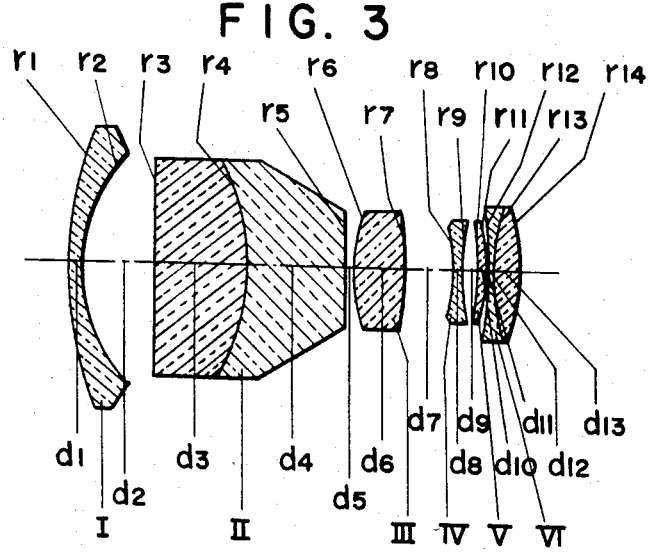
FIG. 3 shows the third embodiment composed also again of an air spaced 6-group of eight lenses in accordance with the present invention.

The essential construction of the lens of the present invention is composed of an air spaced 6-group of seven or eight lenses, as shown in FIGS. 1 to 4, the first group I (from the object side) being a meniscus divergent single lens having a convex surface faced to the object side, the second group II being a thick bonded lens composed of a convergent lens and a divergent lens, and the groups from the third III to the sixth VI all being a single lens or a bonded lens for only one group thereof, said third group III being a convergent group of a biconvex lens, said fourth group IV being a divergent group of a biconcave lens, and said fifth group V and said sixth group VI being respectively a convergent group having a strong convex surface facing the image side, and characterized in being an inverse teletype lens of which the back focus is more than 1.2 times the focal length of the system and meets the following requirements.

(a) $\qquad r_2 < 0.9 r_6, \quad V_1 > 45$ (b) $\qquad d_2 + d_3 + d_4 + d_5 > 0.5 f$ (c) $\qquad d_3 + d_4 / d_2 + d_5 > 2$ (d) $\qquad \frac{N_3 - N_2}{r_4} > \frac{0.13}{f}, \quad 2\left|\frac{1}{r_3} + \frac{1}{r_5}\right| < \frac{-1}{r_4} < \frac{2}{f}$ (e) The air space in the front of the fourth group IV (the object side) is half as long again as the air space in the rear side thereof (the image side)

wherein:

$r_1$, $r_2$: radii of curvature of the refractive surfaces respectively in order from the object side.

$d_1$, $d_2$: spaces on the axis between refractive surfaces respectively in order $N_1$, $N_2$: indices of refraction of each lens used respectively in order $V_1$, $V_2$: Abbe numbers of each lens used respectively in order $f$: focal length of the system.

The constructional description and the operational effect of the lens system in accordance with the present invention are as follows:

In the prior inverse teletype lenses, the effective diameter of the front lens in most of them is $1.5f$ or so, as well known, and it is not possible to say that it is small. For the foregoing purpose and reason, in the lens of the present invention the effective diameter of the front lens is kept to be nearly $1.0f$, however, in general meeting such a dimensional requirement results in excess refractive power and the aberration generated by the front component of the inverse teletype type, and as a whole the distortion, coma, and lateral chromatic aberration greatly increase and accordingly it is impossible to keep the practical level. In order to overcome this problem, in the present invention the divergent front component is only one meniscus divergent lens I, avoiding the convergent lens disposed adjacent in the prior art for compensating aberration and designed to prevent the refractive power of said divergent lens from increasing, and instead the bonded lens II which is considerably thick and weak in refractive power is disposed in the position where a long air space is provided generally. By providing this bonded lens with both end faces having a weak refractive power and a bonded surface having convergent refractive power, the effect of a thick glass is added to compensate the aberration generated by the front divergent lens and at the same time to cause the effect of decreasing the diameter of the front lens from the viewpoint of passage of light. The limit for effectuating action of this second group II is shown in said requirements (c) and (d), and keeping the diameter of the front lens small serves greatly to compensate for distortion, lateral chromatic aberration, coma, and astigmatism. Among them, the astigmatism is important in connection with making the image of an object to be made in a short distance as described above, and in an inverse teletype lens for cameras in large size pictures a small Petzval sum is more necessary.

Also from this viewpoint, the second group II is composed of a convergent lens of high index of refraction and a divergent lens of low index of refraction, so that it serves effectively to decrease the Petzval sum so as to permit the lens of the present invention to be applicable for large size pictures, and the Petzval sum thereof is below at least 0.15 as seen in the following embodiments.

In order to lengthen the back focus which is a fundamental requirement for the inverse teletype lens, in this lens the space between the first group I and the second group III must be larger than a certain limit, and the necessary condition for this purpose is shown in said (b). And, in order to decrease the aberration generated in the first group I to the utmost, as a matter of course the meniscus lens is put to use, and it is understood that the requirement shown in said (a) is effective in connection with the form of the third group III. Without this limit, it is impossible to compensate distortion and lateral chromatic aberration in the rear system. And, as for the dispositions from the third group III to the last group, if the requirement shown in said (e) is not satisfied it is understood that the distortion generated in the first group I cannot be compensated enough.

Figure 4:
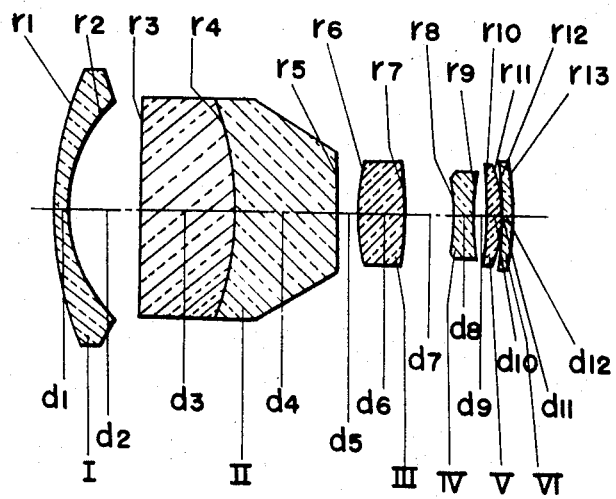
FIG. 4 shows the fourth embodiment composed of an air spaced 6-group of seven lenses in accordance with the present invention.

Next, 4 embodiments on the basis of the requirements described above in accordance with the present invention are shown as follows: It is effective for compensating lateral chromatic aberration and distortion to bond together any one group from the third group III to the last group, however, when the effective diameter of the front lens which is a little dark in the aperture or somewhat small is allowable it is possible to include no bonded group as shown in FIG. 4.

EMBODIMENT 1

$f=1$   1:3.5   Angle of view $2\omega=76°$   Back focus=1.28

| | Radius of curvature | Thickness of core | Index of refraction | Abbe |
|---|---|---|---|---|
| I | $\{r_1=1.3689$<br>$\{r_2=0.5306$ | $d_1=0.0456$<br>$d_2=0.2834$ | $N_1=1.6775$ | $V_1=55.4$ |
| II | $\{r_3=\infty$<br>$\{r_4=-1.1292$<br>$\{r_5=\infty$ | $d_3=0.3471$<br>$d_4=0.3690$<br>$d_5=0.04$ | $N_2=1.7106$<br>$N_3=1.5111$ | $V_2=43.3$<br>$V_3=60.5$ |
| III | $\{r_6=0.9360$<br>$\{r_7=-0.8252$<br>$\{r_8=-1.4304$ | $d_6=0.1965$<br>$d_7=0.03$<br>$d_8=0.1496$ | $N_4=1.7080$<br>$N_5=1.6263$ | $V_4=53.3$<br>$V_5=35.8$ |
| IV | $\{r_9=-0.6033$<br>$\{r_{10}=1.1719$ | $d_9=0.1064$<br>$d_{10}=0.046$ | $N_6=1.6727$ | $V_6=32.2$ |
| V | $\{r_{11}=-2.2307$<br>$\{r_{12}=-0.7088$ | $d_{11}=0.048$<br>$d_{12}=0.003$ | $N_7=1.7200$ | $V_7=50.3$ |
| VI | $\{r_{13}=-2.0247$<br>$\{r_{14}=-0.6803$ | $d_{13}=0.06$<br>$\Sigma d=1.7246$ | $N_8=1.6214$ | $V_8=61.2$ |

EMBODIMENT 2

$f=1$   1:3.5   Angle of view $2\omega=76°$   Back focus=1.28

| | Radius of curvature | Thickness of core | Index of refraction | Abbe |
|---|---|---|---|---|
| I | $\{r_1=1.4533$<br>$\{r_2=0.5780$ | $d_1=0.05$<br>$d_2=0.2886$ | $N_1=1.6700$ | $V_1=57.1$ |
| II | $\{r_3=-23.855$<br>$\{r_4=-0.9825$<br>$\{r_5=7.3567$ | $d_3=0.3519$<br>$d_4=0.3726$<br>$d_5=0.04$ | $N_2=1.7440$<br>$N_3=1.5487$ | $V_2=44.9$<br>$V_3=45.4$ |
| III | $\{r_6=0.9013$<br>$\{r_7=-2.1893$ | $d_6=0.2112$<br>$d_7=0.1901$ | $N_4=1.7200$ | $V_4=50.3$ |
| IV | $\{r_8=-0.6404$<br>$\{r_9=1.4261$ | $d_8=0.0447$<br>$d_9=0.04$ | $N_5=1.5955$ | $V_5=39.2$ |
| V | $\{r_{10}=-4.3702$<br>$\{r_{11}=0.5736$<br>$\{r_{12}=-0.6983$ | $d_{10}=0.02$<br>$d_{11}=0.125$<br>$d_{12}=0.003$ | $N_6=1.7495$<br>$N_7=1.6779$ | $V_6=34.9$<br>$V_7=53.3$ |
| VI | $\{r_{13}=-2.6191$<br>$\{r_{14}=-0.9201$ | $d_{13}=0.05$<br>$\Sigma d=1.7870$ | $N_8=1.7200$ | $V_8=50.3$ |

EMBODIMENT 3

$f=1$   1:3.5   Angle of view $2\omega=76°$   Back focus=1.28

| | Radius of curvature | Thickness of core | Index of refraction | Abbe |
|---|---|---|---|---|
| I | $\{r_1=1.4280$<br>$\{r_2=0.5884$ | $d_1=0.05$<br>$d_2=0.2992$ | $N_1=1.6775$ | $V_1=55.4$ |
| II | $\{r_3=-12.192$<br>$\{r_4=-0.8886$<br>$\{r_5=6.8385$ | $d_3=0.3573$<br>$d_4=0.3833$<br>$d_5=0.04$ | $N_2=1.7440$<br>$N_3=1.5407$ | $V_2=44.9$<br>$V_3=47.2$ |
| III | $\{r_6=0.8853$<br>$\{r_7=-3.0870$ | $d_6=0.2008$<br>$d_7=0.1912$ | $N_4=1.7200$ | $V_4=50.3$ |
| IV | $\{r_8=-0.6070$<br>$\{r_9=1.3799$ | $d_8=0.0457$<br>$d_9=0.04$ | $N_5=1.6129$ | $V_5=37.0$ |
| V | $\{r_{10}=-2.1759$<br>$\{r_{11}=-0.6765$ | $d_{10}=0.0499$<br>$d_{11}=0.003$ | $N_6=1.7170$ | $V_6=47.9$ |
| VI | $\{r_{12}=-5.9841$<br>$\{r_{13}=0.6685$<br>$\{r_{14}=-0.7796$ | $d_{12}=0.02$<br>$d_{13}=0.13$<br>$\Sigma d=1.8104$ | $N_7=1.7400$<br>$N_8=1.6775$ | $V_7=37.5$<br>$V_8=55.4$ |

EMBODIMENT 4

$f=1$   1:4   Angle of view $2\omega=76°$   Back focus=1.28

| | Radius of curvature | Thickness of core | Index of refraction | Abbe |
|---|---|---|---|---|
| I | $\{r_1=1.5241$<br>$\{r_2=0.5722$ | $d_1=0.05$<br>$d_2=0.2819$ | $N_1=1.6204$ | $V_1=60.3$ |
| II | $\{r_3=-13.510$<br>$\{r_4=-1.1687$<br>$\{r_5=23.175$ | $d_3=0.3708$<br>$d_4=0.4041$<br>$d_5=0.0779$ | $N_2=1.7200$<br>$N_3=1.5176$ | $V_2=50.3$<br>$V_3=53.5$ |
| III | $\{r_6=0.9035$<br>$\{r_7=-1.8891$ | $d_6=0.1981$<br>$d_7=0.1912$ | $N_4=1.7200$ | $V_4=50.3$ |
| IV | $\{r_8=-0.6060$<br>$\{r_9=1.3904$ | $d_8=0.0876$<br>$d_9=0.04$ | $N_5=1.7147$ | $V_5=29.4$ |
| V | $\{r_{10}=-2.4003$<br>$\{r_{11}=-0.6681$ | $d_{10}=0.055$<br>$d_{11}=0.003$ | $N_6=1.7200$ | $V_6=50.3$ |
| VI | $\{r_{12}=-2.4010$<br>$\{r_{13}=-0.7370$ | $d_{12}=0.055$<br>$\Sigma d=1.8147$ | $N_7=1.6775$ | $V_7=55.4$ |

What is claimed is:

1. An inverted telephoto type wide-angle lens system comprising from the object side; a first lens group I composed of a meniscus divergent single lens having its convex surface facing the object side, a second lens group II composed of a convergent lens and a divergent lens bonded together at their respective convex and concave surfaces, a third convergent lens group III having biconvex surfaces, a fourth divergent lens group IV having biconcave surfaces, a fifth convergent lens group V having a concave surface on the object side and a convex surface on the image side, and a sixth convergent lens group VI having a concave surface on the object side and a convex surface on the image side, and having the numerical data substantially as set forth in the following table:

| | Radius of curvature | Thickness of core | Index of refraction | Abbe |
|---|---|---|---|---|
| I | $\{r_1=1.5241$<br>$\{r_2=0.5722$ | $d_1=0.05$<br>$d_2=0.2819$ | $N_1=1.6204$ | $V_1=60.3$ |
| II | $\{r_3=-13.510$<br>$\{r_4=-1.1687$<br>$\{r_5=23.175$ | $d_3=0.3708$<br>$d_4=0.4041$<br>$d_5=0.0779$ | $N_2=1.7200$<br>$N_3=1.5176$ | $V_2=50.3$<br>$V_3=53.5$ |
| III | $\{r_6=0.9035$<br>$\{r_7=-1.8891$ | $d_6=0.1981$<br>$d_7=0.1912$ | $N_4=1.7200$ | $V_4=50.3$ |
| IV | $\{r_8=-0.6060$<br>$\{r_9=1.3904$ | $d_8=0.0876$<br>$d_9=0.04$ | $N_5=1.7174$ | $V_5=29.4$ |
| V | $\{r_{10}=-2.4003$<br>$\{r_{11}=-0.6681$ | $d_{10}=0.055$<br>$d_{11}=0.003$ | $N_6=1.7200$ | $V_6=50.3$ |
| VI | $\{r_{12}=-2.4010$<br>$\{r_{13}=-0.7370$ | $d_{12}=0.055$<br>$\Sigma d=1.8147$ | $N_7=1.6775$ | $V_7=55.4$ | and wherein:

$f=1$, aperture ratio 1:4, angle of view $2w=76°$, back focus=1.28.

2. An inverted telephoto type wide-angle lens system comprising from the object side; a first lens group I composed of a meniscus divergent single lens having its convex surface facing the object side, a second lens group II composed of a convergent lens and a divergent lens bonded together at their respective convex and concave surfaces, a third convergent lens group III having biconvex surfaces, a fourth divergent lens group IV having biconcave surfaces, a fifth convergent lens group V having a concave surface on the object side and a convex surface on the image side, and a sixth convergent lens group VI having a concave surface on the object side and a convex surface on the image side, and having the numerical data substantially as set forth in the following table:

|  | Radius of curvature | Thickness of core | Index of refraction | Abbe |
|---|---|---|---|---|
| I | $r_1=1.3689$<br>$r_2=0.5306$ | $d_1=0.0456$<br>$d_2=0.2834$ | $N_1=1.6775$ | $V_1=55.4$ |
| II | $r_3=\infty$<br>$r_4=-1.1292$<br>$r_5=\infty$ | $d_3=0.3471$<br>$d_4=0.3690$<br>$d_5=0.04$ | $N_2=1.7106$<br>$N_3=1.5111$ | $V_2=43.3$<br>$V_3=60.5$ |
| III | $r_6=0.9360$<br>$r_7=-0.8252$<br>$r_8=-1.4304$ | $d_6=0.1965$<br>$d_7=0.03$<br>$d_8=0.1496$ | $N_4=1.7080$<br>$N_5=1.6263$ | $V_4=53.3$<br>$V_5=35.8$ |
| IV | $r_9=-0.6033$<br>$r_{10}=1.1719$ | $d_9=0.1064$<br>$d_{10}=0.046$ | $N_6=1.6727$ | $V_6=32.2$ |
| V | $r_{11}=-2.2307$<br>$r_{12}=-0.7088$ | $d_{11}=0.048$<br>$d_{12}=0.003$ | $N_7=1.7200$ | $V_7=50.3$ |
| VI | $r_{13}=-2.0247$<br>$r_{14}=-0.6803$ | $d_{13}=0.06$<br>$\Sigma d=1.7246$ | $N_8=1.6214$ | $V_8=61.2$ | and wherein:
$f=1$, aperture ratio 1:3.5, angle of view $2w=76°$, back focus$=1.28$.

3. An inverted telephoto type wide-angle lens system comprising from the object side; a first lens group I composed of a meniscus divergent single lens having its convex surface facing the object side, a second lens group II composed of a convergent lens and a divergent lens bonded together at their respective convex and concave surfaces, a third convergent lens group III having biconvex surfaces, a fourth divergent lens group IV having biconcave surfaces, a fifth convergent lens group V having a concave surface on the object side and a convex surface on the image side, and a sixth convergent length group VI having a concave surface on the object side and a convex surface on the image side, and having the numerical data substantially as set forth in the following table:

|  | Radius of curvature | Thickness of core | Index of refraction | Abbe |
|---|---|---|---|---|
| I | $r_1=1.4535$<br>$r_2=0.5780$ | $d_1=0.05$<br>$d_2=0.2886$ | $N_1=1.6700$ | $V_1=57.1$ |
| II | $r_3=-23.855$<br>$r_4=-0.9825$<br>$r_5=7.3567$ | $d_3=0.3519$<br>$d_4=0.3726$<br>$d_5=0.04$ | $N_2=1.7440$<br>$N_3=1.5487$ | $V_2=44.9$<br>$V_3=45.4$ |
| III | $r_6=0.9013$<br>$r_7=-2.1893$ | $d_6=0.2112$<br>$d_7=0.1901$ | $N_4=1.7200$ | $V_4=50.3$ |
| IV | $r_8=-0.6404$<br>$r_9=1.4261$ | $d_8=0.0447$<br>$d_9=0.04$ | $N_5=1.5955$ | $V_5=39.2$ |
| V | $r_{10}=-4.3702$<br>$r_{11}=0.5736$<br>$r_{12}=-0.6983$ | $d_{10}=0.02$<br>$d_{11}=0.125$<br>$d_{12}=0.003$ | $N_6=1.7495$<br>$N_7=1.6779$ | $V_6=34.9$<br>$V_7=53.3$ |
| VI | $r_{13}=-2.6191$<br>$r_{14}=-0.9201$ | $d_{13}=0.05$<br>$\Sigma d=1.7870$ | $N_8=1.7200$ | $V_8=50.3$ | and wherein:
$f=1$, aperture ratio 1:3.5, angle of view $2w=76°$, back focus$=1.28$.

4. An inverted telephoto type wide-angle lens system comprising from the object side; a first lens group I composed of a meniscus divergent single lens having its convex surface facing the object side, a second lens group II composed of a convergent lens and a divergent lens bonded together at their respective convex and concave surfaces, a third convergent lens group III having biconvex surfaces, a fourth divergent lens group IV having biconcave surfaces, a fifth convergent lens group V having a concave surface on the object side and a convex surface on the image side, and a sixth convergent lens group VI having a concave surface on the object side and a convex surface on the image side, and having the numerical data substantially as set forth in the following table:

|  | Radius of curvature | Thickness of core | Index of refraction | Abbe |
|---|---|---|---|---|
| I | $r_1=1.4280$<br>$r_2=0.5884$ | $d_1=0.05$<br>$d_2=0.2992$ | $N_1=1.6775$ | $V_1=55.4$ |
| II | $r_3=-12.192$<br>$r_4=-0.8886$<br>$r_5=6.8385$ | $d_3=0.3573$<br>$d_4=0.3833$<br>$d_5=0.04$ | $N_2=1.7440$<br>$N_3=1.5407$ | $V_2=44.9$<br>$V_3=47.2$ |
| III | $r_6=0.8853$<br>$r_7=-3.0870$ | $d_6=0.2008$<br>$d_7=0.1912$ | $N_4=1.7200$ | $V_4=50.3$ |
| IV | $r_8=-0.6070$<br>$r_9=1.3799$ | $d_8=0.0457$<br>$d_9=0.04$ | $N_5=1.6129$ | $V_5=37.0$ |
| V | $r_{10}=-2.1759$<br>$r_{11}=-0.6765$ | $d_{10}=0.0499$<br>$d_{11}=0.003$ | $N_6=1.7170$ | $V_6=47.9$ |
| VI | $r_{12}=-5.9841$<br>$r_{13}=0.6685$<br>$r_{14}=-0.7796$ | $d_{12}=0.02$<br>$d_{13}=0.13$<br>$\Sigma d=1.8104$ | $N_7=1.7400$<br>$N_8=1.6775$ | $V_7=37.5$<br>$V_8=55.4$ | and wherein:
$f=1$, aperture ratio 1:3.5, angle of view $2w=76°$, back focus$=1.28$

References Cited

UNITED STATES PATENTS 3,507,559  4/1970  Mori _____ 350—214
3,318,653  5/1967  Macher _____ 350—215
3,467,464  9/1969  Ruehl _____ 350—216

JOHN K. CORBIN, Primary Examiner